(12) United States Patent
Miller

(10) Patent No.: US 9,272,378 B1
(45) Date of Patent: Mar. 1, 2016

(54) SYSTEM FOR HOLDING WORKING OBJECTS

(75) Inventor: Richard V. Miller, Denton, TX (US)

(73) Assignee: Elijah Tooling, Inc., Denton, TX (US)

( * ) Notice: Subject to any disclaimer, the term of this patent is extended or adjusted under 35 U.S.C. 154(b) by 1072 days.

(21) Appl. No.: 13/347,420

(22) Filed: Jan. 10, 2012

Related U.S. Application Data

(63) Continuation-in-part of application No. 12/540,318, filed on Aug. 12, 2009, now Pat. No. 8,770,902, which is a continuation-in-part of application No. 11/473,274, filed on Jun. 22, 2006, now abandoned.

(60) Provisional application No. 60/698,596, filed on Jul. 12, 2005.

(51) Int. Cl.
*B23Q 1/42* (2006.01)
*B23Q 1/28* (2006.01)
*B23Q 3/06* (2006.01)
*B23Q 37/00* (2006.01)

(52) U.S. Cl.
CPC .. *B23Q 1/42* (2013.01); *B23Q 1/28* (2013.01); *B23Q 3/06* (2013.01); *B23Q 37/005* (2013.01); *Y10T 29/49895* (2015.01); *Y10T 29/49947* (2015.01); *Y10T 29/49998* (2015.01); *Y10T 29/53991* (2015.01)

(58) Field of Classification Search
CPC ............ B23Q 1/42; B23Q 1/25; B23Q 1/262; B23Q 1/28; B23Q 3/02; B23Q 3/06; B23Q 37/005; Y10T 29/49895; Y10T 29/49947; Y10T 29/49998; Y10T 29/505; Y10T 29/53991

USPC ................................................ 269/55, 58, 59
See application file for complete search history.

(56) References Cited

U.S. PATENT DOCUMENTS

| | | | |
|---|---|---|---|
| 1,842,724 A | 1/1932 | Langsner | |
| 2,376,089 A | 5/1945 | Savageau | |
| 2,587,025 A * | 2/1952 | Beck et al. | 269/146 |
| 2,625,861 A * | 1/1953 | Swanson | 269/157 |
| 2,639,179 A | 5/1953 | Phelps | |
| 2,705,441 A * | 4/1955 | Armstrong | 269/91 |
| 2,919,736 A | 1/1960 | Kann | |
| 2,988,855 A | 6/1961 | Asfour et al. | |
| 2,992,685 A | 7/1961 | Madsen | |
| 3,124,190 A | 3/1964 | Cornell | |

(Continued)

OTHER PUBLICATIONS

Boeing drawing "Back-Bolt Assembly," Dec. 13, 1993.

(Continued)

*Primary Examiner* — Christopher M Koehler
(74) *Attorney, Agent, or Firm* — James E. Walton

(57) ABSTRACT

A modular vise system for holding working objects. The system includes a fixture plate and an adjustable vise member for coupling the working object to the fixture plate. The adjustable vise member is configured to locate and secure the working object in relation to the fixture plate. The adjustable vise member includes a body, a moveable assembly, and a gripper. The body has a fastener configured to allow the body to selectively translate relative to the fixture plate. The body has a cavity formed within it. The moveable assembly is housed at least partially within the cavity of the body and configured to selectively translate relative to the body, thereby allowing further precision locating of the working object. The gripper is configured to secure the working object. The gripper is coupled to the moveable assembly.

15 Claims, 11 Drawing Sheets

(56) References Cited

U.S. PATENT DOCUMENTS

| | | | |
|---|---|---|---|
| 3,250,559 A | 5/1966 | Sommerfield | |
| 3,255,799 A | 6/1966 | Heimovics | |
| 3,424,212 A | 1/1969 | Kemper | |
| 3,537,697 A * | 11/1970 | Davis | 269/50 |
| 3,578,799 A * | 5/1971 | Davis | 269/51 |
| 3,683,988 A | 8/1972 | Carter et al. | |
| 4,139,315 A | 2/1979 | Levy et al. | |
| 4,275,983 A * | 6/1981 | Bergman | 414/676 |
| 4,396,327 A | 8/1983 | Menke | |
| 4,534,546 A * | 8/1985 | Cattani | 269/58 |
| 4,723,881 A | 2/1988 | Duran | |
| 4,735,536 A | 4/1988 | Duran | |
| 4,747,738 A | 5/1988 | Duran | |
| 4,815,908 A | 3/1989 | Duran et al. | |
| 4,846,622 A | 7/1989 | Lien | |
| 4,863,326 A | 9/1989 | Vickers | |
| 4,865,500 A | 9/1989 | Duran et al. | |
| 4,884,930 A | 12/1989 | Dobbeler | |
| 4,915,557 A | 4/1990 | Stafford | |
| 4,934,888 A | 6/1990 | Corsmeier et al. | |
| 4,963,063 A | 10/1990 | Gulistan | |
| 5,338,139 A | 8/1994 | Swanstrom | |
| 5,462,395 A | 10/1995 | Damm et al. | |
| 5,611,654 A | 3/1997 | Frattarola et al. | |
| 6,022,009 A * | 2/2000 | Hill | 269/47 |
| 6,095,736 A | 8/2000 | Miller et al. | |
| 6,102,640 A | 8/2000 | Yokohama et al. | |
| 6,220,803 B1 | 4/2001 | Schellhase | |
| 6,296,431 B1 * | 10/2001 | Miller | 411/353 |
| 6,312,185 B1 | 11/2001 | Ernst | |
| 7,004,699 B2 | 2/2006 | Petrok et al. | |

OTHER PUBLICATIONS

Vought drawing, date unknown.
Vought Aircraft Company drawing, Jan. 4, 1994, maybe earlier.
Schunk—Workholding Solutions, Automation Components, Toolholding Components. Printed from www.schunk.com website, Aug. 6, 2009.
Jergens Catalog—Ball Lock Mounting System catalogue, last accessed on Aug. 12, 2009.
Office Action from U.S. Patent and Trademark Office on Sep. 26, 2008 from corresponding U.S. Appl. No. 11/473,420.
Office Action from U.S. Patent and Trademark Office on Mar. 12, 2009 from corresponding U.S. Appl. No. 11/473,420.

* cited by examiner

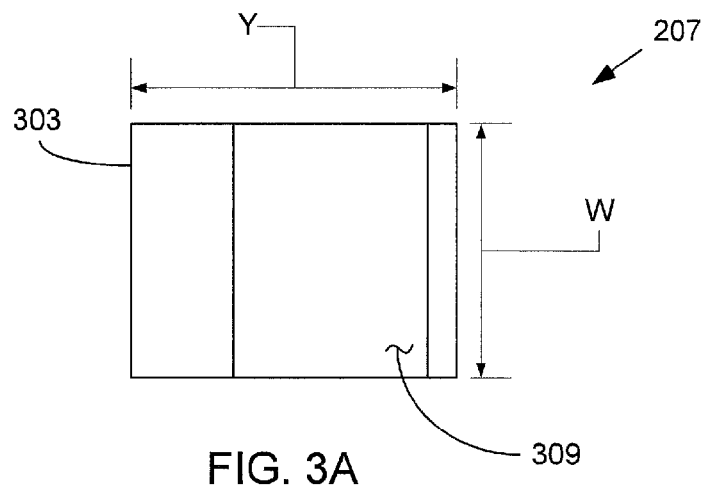
FIG. 3A
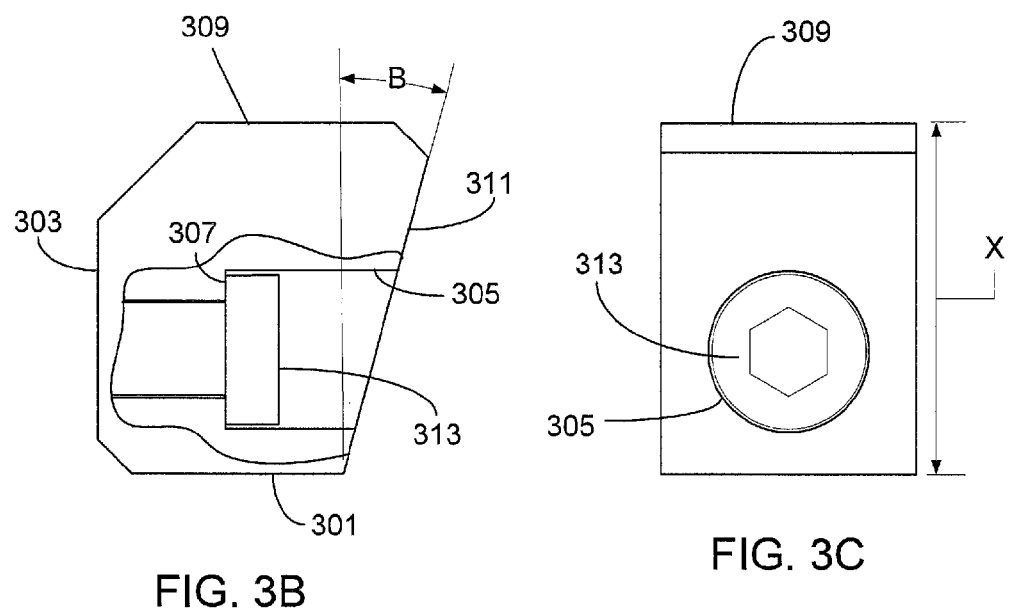
FIG. 3B
FIG. 3C

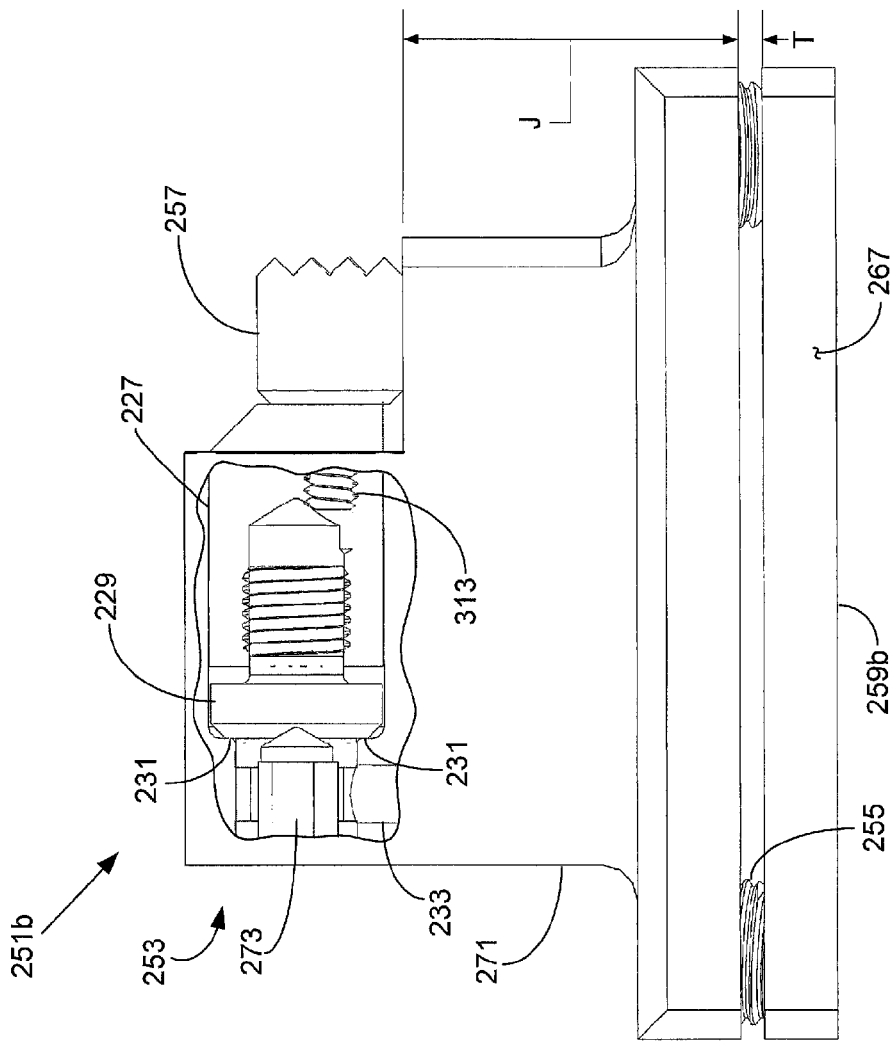
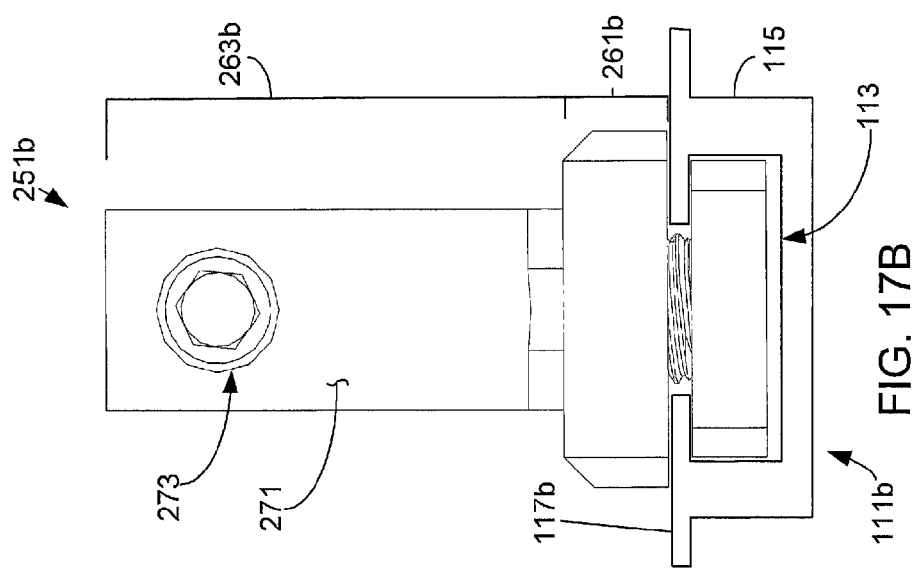
FIG. 17A
FIG. 17B

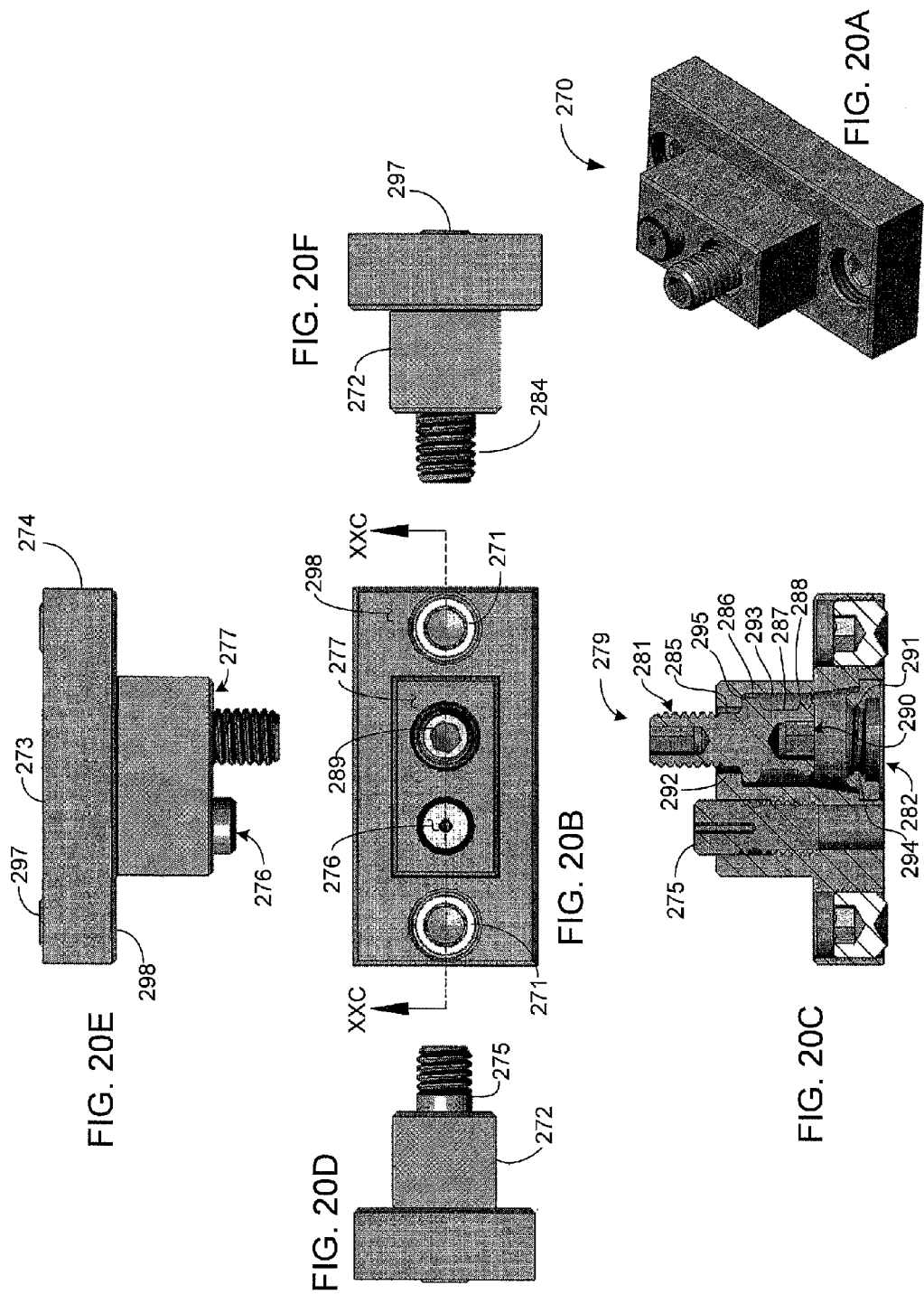

SYSTEM FOR HOLDING WORKING OBJECTS

CROSS REFERENCE TO RELATED APPLICATIONS

This application is a continuation-in-part of U.S. Non-provisional application Ser. No. 12/540,318, filed 12 Aug. 2009, titled "Precision Locating Fastening System," which issued as U.S. Pat. No. 8,770,902, 8 Jul. 2014, which is hereby incorporated by reference for all purposes as if fully set forth herein, which claims the benefit of U.S. Non-provisional application Ser. No. 11/473,274, filed 22 Jun. 2006, titled "Fastening System," which is hereby incorporated by reference for all purposes as if fully set forth herein, which claims the benefit of U.S. Provisional Application No. 60/698,596, filed 12 Jul. 2005, titled "Fastening System," which is hereby incorporated by reference for all purposes as if fully set forth herein.

BACKGROUND

1. Field of the Invention

The present application relates to work-holding tooling equipment. In particular, the present application relates to a modular vise system.

2. Description of the Prior Art

Tooling fixtures are commonly used in the prior art. Tooling components are used to hold a work-piece to the fixture. One type of component is a dovetail vise. This component has some limitations. Typically, the dovetail vise has a relatively large rectangular body of fixed size containing multiple sliding pads used to secure the work-piece. The pads are typically parallel and slide in the same direction. The distance between opposing pads is limited as well. Thus the shape and size of the work-piece is limited.

Furthermore, the size of the vise does not change with respect to the size of the work-piece. If a small work-piece is used, only a portion of the pads may be used to secure the work-piece where the rest of the pads remain unused. This results in lower fixture plate efficiency because the vise consumes a larger surface area of the fixture than needed to secure the work-piece, thereby lessening usable fixture space.

Often the work-piece rests on the bottom of the vise and is secured from the sides with the pads. In instances where tooling requires holes drilled through the entire height of the work-piece, damage to the vise could occur. Therefore, sacrifice plates are typically used beneath or to the sides of the working-piece.

Although great strides have been made in the area of tooling vises, considerable shortcomings remain.

DESCRIPTION OF THE DRAWINGS

The novel features believed characteristic of the application are set forth in the appended claims. However, the application itself, as well as a preferred mode of use, and further objectives and advantages thereof, will best be understood by reference to the following detailed description when read in conjunction with the accompanying drawings, wherein:

FIGS. 3A-3C are a top, side, and front views, respectively, of a gripper in the system of FIG. 1;

FIG. 17A is a side view of the adjustable vise member of FIG. 16 including a partial section view of a moveable assembly;

FIG. 17B is a rear view of the adjustable vise member of FIG. 16;

FIGS. 20A-20F are oblique, top, bottom, and side views of a locating slider according to the preferred embodiment of the present application.

Figure 1:
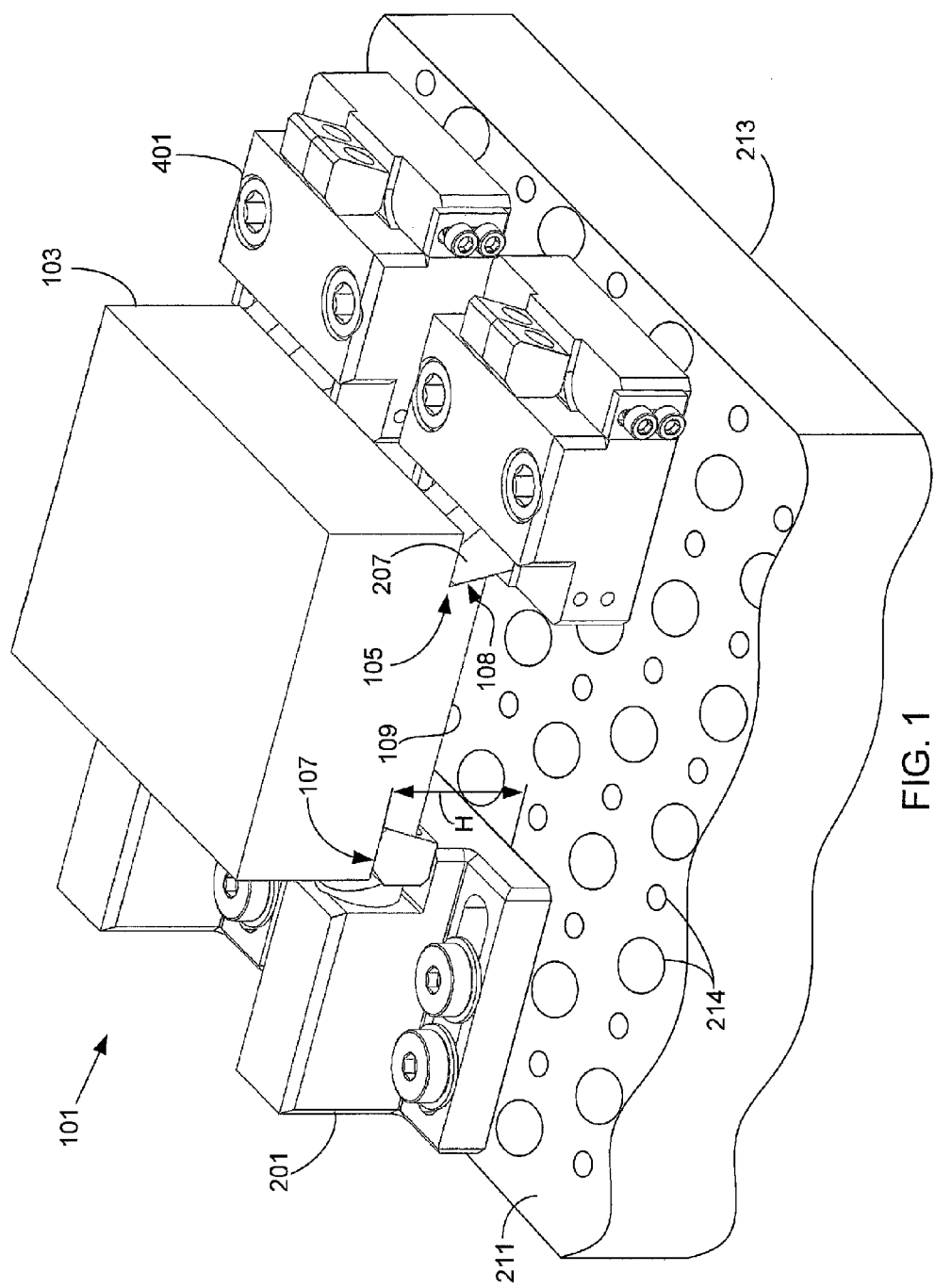
FIG. 1 is an oblique view of a modular vise system according to the preferred embodiment of the present application.

While the system and method of the present application is susceptible to various modifications and alternative forms, specific embodiments thereof have been shown by way of example in the drawings and are herein described in detail. It should be understood, however, that the description herein of specific embodiments is not intended to limit the application to the particular embodiment disclosed, but on the contrary, the intention is to cover all modifications, equivalents, and alternatives falling within the spirit and scope of the process of the present application as defined by the appended claims.

DETAILED DESCRIPTION OF THE PREFERRED EMBODIMENT

Referring to FIG. 1 in the drawings, two members of a modular vise system 101 holding a stock piece of dovetail material 103 is illustrated. System 101 is composed of a number of modular members, including an adjustable vise member 201 and a fixed vise member 401 that work together to secure a working object, such as component parts and/or working material. System 101 is typically used for the purposes of milling, working, and manufacturing working material. Working material refers to any material to be worked, milled, or machined, such as dovetail material 103 having a number of angled grooves 105 specifically designed to secure dovetail material 103 in position. Working material also refers to a piece of plane material (not shown) of any size and shape secured by system 101 without the use of grooves 105.

Figure 16:
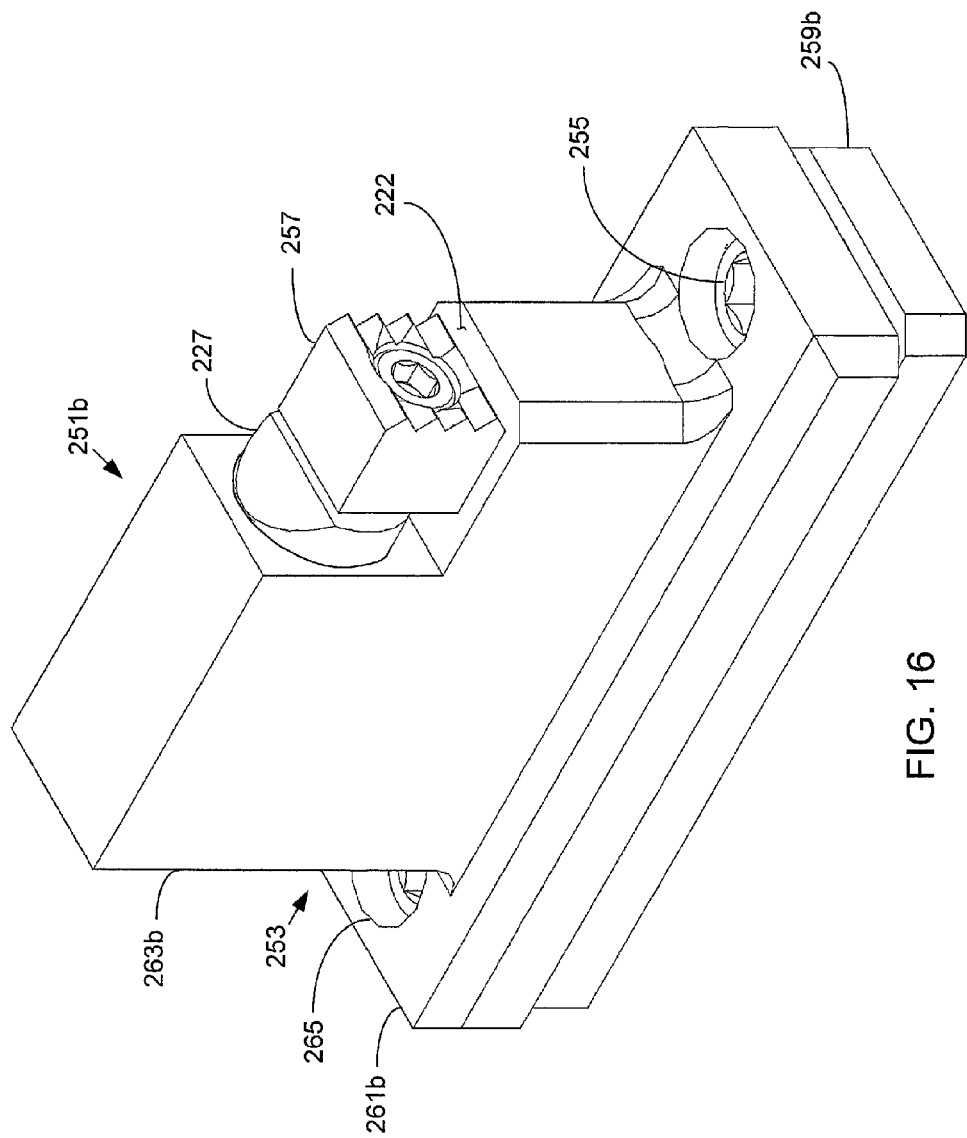
FIG. 16 is an oblique view of another embodiment of the adjustable vise member of FIG. 2 adapted to fasten to a fixture plate using a T-slot.

System 101 may be used with a multitude of grippers. Grippers refer to any type of member designed to contact and secure working material. An example of a gripper would be a dovetail pad 207 as seen in FIG. 1 or a serrated pad 257 as seen in FIG. 16. Particular discussion will be made concerning each gripper later in the specification.

As seen in FIG. 1, grooves 105 create a "dovetail" shape configured to accept dovetail pad 207, thereby allowing for dovetail material 103 to be secured by interference fit. Groove 105 includes an upper surface 107 and an angled surface 108. Dovetail material 103 is precisely located at a positive location a distance H above a top surface 211 of a fixture plate 213 by contacting dovetail pad 207 along upper surface 107. Dovetail pad 207 is configured to press against angled surface 108, thereby securing dovetail material 103 by interference fit.

Although distance H is depicted in connection with adjustable vise member 201, it is understood that adjustable vise member 201 and fixed vise member 401 are configured to support and secure dovetail material 103 a distance H above top surface 211. Additionally, it is understood that although grooves 105 typically extend the length of dovetail material 103, grooves 105 may be incorporated along selected portions in dovetail material 103.

System 101 of the present application is designed to work preferably with universal modular fixtures, as depicted by fixture plate 213, which employ the following: custom designed tooling fixtures (not shown) or any number of sub-plates (not shown). Fixture plate 213 is representative of a universal modular fixture. Multipurpose locating apertures 214 are formed within fixture plate 213 to permit any degree of precision locating for up to three axes of direction. Multipurpose locating apertures 214 are configured to accept several types of fasteners, pins, and plugs, to name a few. Furthermore, multipurpose locating apertures 214 may be configured to accept and use retractable fastening systems that retract below top surface 211, threaded inserts, bushings, and/or bored or threaded holes for locating portions of system 101. With respect to the present application, a fixture plate 213 will be used to represent the various types of fixtures or sub-plates.

Figure 2:
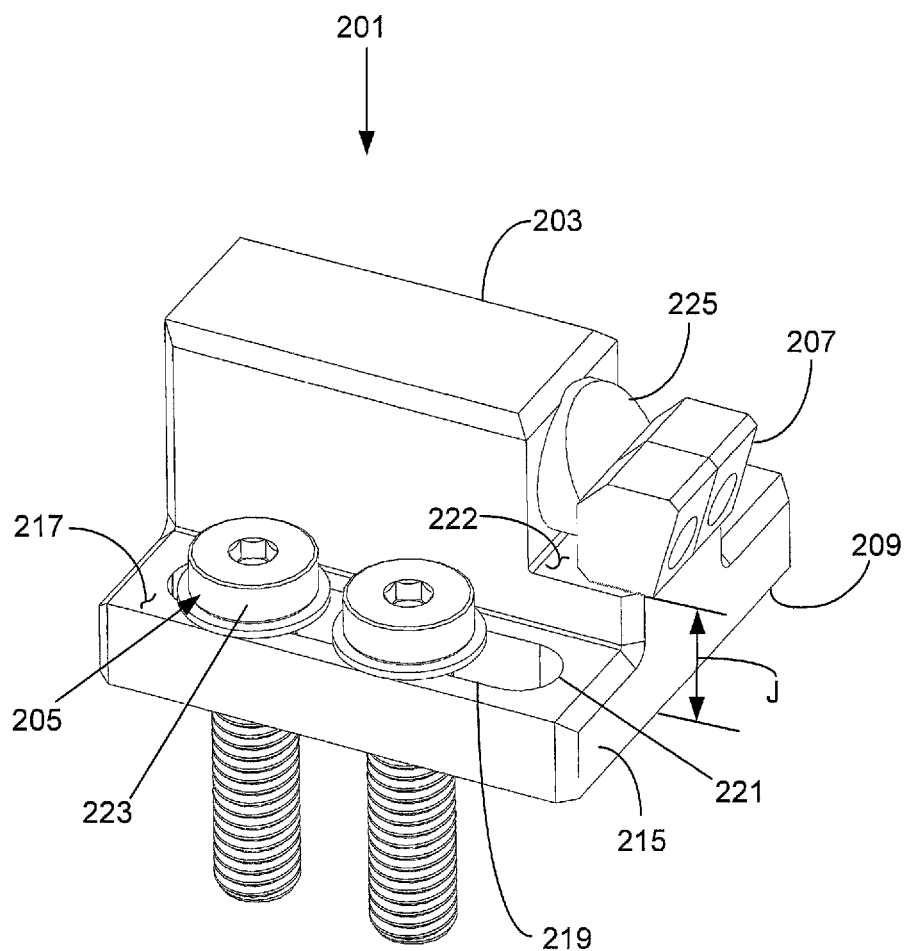
FIG. 2 is an oblique view of an adjustable vise member in the system of FIG. 1.

Referring now also to FIG. 2 in the drawings, an adjustable vise member 201 of the present application is illustrated. Adjustable vise member 201 contains a body 203, fasteners 205, and one or more dovetail pads 207. Body 203 has a bottom surface 209 that contacts with top surface 211 of fixture plate 213. Typically, bottom surface 209 and top surface 211 are in contact, but it should be appreciated that in another embodiment, a distance may exist between bottom surface 209 and top surface 211.

Body 203 is designed to maintain a relatively compact shape and relatively small footprint. This permits the use of a precise number of adjustable vise members 201 to be used when securing the working object. Furthermore, adjustable vise member 201 is configured to contact selectively chosen locations of the working object, therefore adjustable vise member 201 may be tightly positioned adjacent to each other or spread apart. This allows a minimal number of adjustable vise members 201 to be tightly positioned on fixture plate 213. The number of adjustable vise members 201 would be dependent on the size of dovetail material 103, thereby maximizing usable space. This design yields a higher fixture plate efficiency, wherein more dovetail materials 103 may be secured to fixture plate 213 at the same time.

In the preferred embodiment, adjustable vise member 201 has an adjustable body 203, thereby permitting adjustable vise member 201 to translate along surface 211. The position of body 203 relative to fixture plate 213 is adjusted by the use of fasteners 205 and a flange 215. Fasteners 205 are used to secure adjustable vise member 201 to fixture plate 213. In the preferred embodiment, flange 215 extends out from opposing sides of body 203. The lower surface of flange 215 is flush with and adjacent to bottom surface 209 of body 203, thereby creating one continuous and uninterrupted bottom surface 209. Flange 215 also has an upper surface 217. A slide hole 219 protrudes through flange 215 from upper surface 217 through bottom surface 209. Slide hole 219 is typically rectangular in shape having rounded corners 221 although other shapes are possible. Although described as using slide hole 219, it is understood that other embodiments of flange 215 may neglect to include slide hole 219. In such instances, fasteners 205 may include clamps or side bolts, for example.

Fastener 205 is designed to locate and secure body 203 on fixture plate 213. Fasteners 205 are inserted through slide hole 219 and tightened wherein fastener head 223 extends over slide hole 219 and presses against upper surface 217. Slide holes 219 in each flange 215 are designed to be parallel. When fasteners 205 are loosened, body 203 is able to translate on top surface 211. The translation of adjustable vise member 201 along slide hole 219 allows for coarse or gross adjustments to be made regarding the location of body 203. As will be discussed later on, fine adjustments, or more precise adjustments of the gripper are made with adjustable body 225.

This adjustable feature allows adjustable vise member 201 to adjust to various sized working objects, such as dovetail material 103, without the need to remove fasteners 205 from fixture plate 213. Since fasteners 205 need only be loosened to permit body 203 to translate, the speed of interchanging working objects is increased, thereby increasing user efficiency. The adjustable feature allows the user flexibility to use one tool fixture to operate a larger range of working objects without repositioning fasteners 205, thereby also reducing the need of additional tool design when using dedicated fixtures. For example, to interchange a working material, fasteners 205 may be loosened to allow body 203 to translate along top surface 211, thereby releasing a first working object. The first working object being removed. Likewise, body 203 may translate along top surface 211 and press against a second working object, wherein the second working object is sized different than the first working object. In such an example, fasteners 205 were loosened and tightened while remaining in fixture plate 213.

Although described and illustrated in a specific embodiment, it should be understood that body 203 may be shaped, formed, or sized in any manner. It should also be understood that flange 215 may be sized, oriented, and located with respect to body 203 in a multitude of ways. Furthermore, one or more flanges 215 may be used. For example, flange 215 may be relatively large having one or more slide holes 219 and/or extend from one or more sides of body 203. Additionally, flange 215 may extend along only a portion of a side of body 203.

Another example of flange 215 includes elevating flanges 215, such that each flange is parallel to top surface 211 but are aligned in separate planes from one another. In this situation, the lower surface of flange 215 and bottom surface 209 of body 203 may be discontinuous and nonadjacent. Flanges 215 may be positioned to allow flanges to stack one above the other, so as to allow flanges 215 of several vise members 201 to share the same fasteners 205, thereby further increasing fixture plate efficiency. Fasteners 205 are typically dowel pins but it is understood that fasteners 205 are not so limited. Fasteners 205 may be any type of fasteners to operably couple with fixture plate 213 and secure adjustable vise member 201. Furthermore, it is understood that fastener 205 may be precision dowel pins or any other type fastener that permits adjustable vise member 201 to operate as described.

Although adjustable vise member 201 has been described in the preferred embodiment as using non-precision fasteners, it is understood that adjustable vise member 201 may include locating apertures (not shown) located on any portion of flange 215 and/or body 203. Locating apertures would be configured to accept a stud, pin, or retractable fastener coupled to fixture plate 213. In so doing, adjustable vise member may be precisely located on fixture plate 213. Fasteners 205 may be used to secure adjustable vise member 201 to fixture plate 213.

As seen in FIG. 2, adjustable vise member 201 is shown using dovetail pads 207 to support and secure dovetail material 103. Dovetail pads 207 are configured to contact grooves 105 without interference from body 203. One or more dovetail pads 207 may be used. In the preferred embodiment, two dovetail pads 207 are used. Dovetail pads 207 are located adjacent to a raised locating surface 222 of body 203. Raised locating surface 222 is a height J above top surface 211. Dovetail pads 207 are configured to accept sliding contact with surface 222.

Dovetail pads 207 are coupled to a moveable assembly 225 and moveable assembly 225 is operably coupled to body 203 so as to allow moveable assembly 225 to translate into and/or out of body 203. Moveable assembly 225 is adjustable relative to body 203 and fasteners 205. Moveable assembly 225 allows for the fine or precise adjustment of dovetail pads 207 as compared to fasteners 205. Moveable assembly 225 refers to any device, element, or material designed to permit the movement of dovetail pads 207. A more detailed description of moveable assembly 225 will be given later in the specification in relation to FIGS. 17A and 19.

Although the preferred embodiment describes dovetail pads 207 in specific locations, it should be understood that dovetail pads 207 may be located in any number of locations and using any number of methods. Also, another embodiment may couple dovetail pads 207 directly to body 203 of adjustable vise member 201, wherein no moveable assembly 225 is used. In such an embodiment, the grippers would be in a fixed location coupled to body 203. Therefore, only coarse adjustments of adjustable vise member 201 may be made.

In other embodiments, it is understood that the grippers may be moved and precisely located by other methods than that described. For example, a screw that is not captured may move in or out of body 203, thereby translating the grippers. Furthermore, it is understood that moveable assembly 225 may also permit the movement and/or orientation of the gripper in any direction. For example, grippers may be oriented so as to accept different facets of working objects, such as corners or multi-directional sides, to name a few.

Referring now also to FIGS. 3A-3C in the drawings, top, side, and front views, respectively, of dovetail pads 207 of the present application are illustrated. Dovetail pads 207 have a top surface 309 and a front surface 311. Front surface 311 is configured to be at an angle B with respect to the vertical. This configuration permits pads 207 to fit in groove 105 such that surface 107 contacts top surface 309 and surface 108 contacts front surface 311. The design allows dovetail pad 207 to locate and secure dovetail material 103. In locating dovetail material 103, surface 107 contacts top surface 309, thereby preventing movement in the downward direction and suspending the working object above top surface 211. In securing dovetail material 103, dovetail pad 207 presses against surface 108 in groove 105 creating interference fit such that dovetail material 103 is immobilized. Both surfaces 107 and 108 experience some force when secured by dovetail pad 207 due to angled surface 108 and the corresponding surface of dovetail pad 207.

Dovetail pad 207 is made from a metallic material amenable for machining purposes, such as aluminum or metal, to name a few. Dovetail pad 207 has an overall length Y, a height X, and a width W. Although dovetail pad 207 may be sized to any proportion, dovetail pad 207 of the preferred embodiment may have dimensions such as: Y=0.656", X=0.7", or B=15°, for example. Angle B predominantly affects how dovetail pad 207 engages groove 105. Width W may have any value. As W increases, the surface area in contact with dovetail material 103 increases but generally does not affect how dovetail pad 207 engages with groove 105.

Dovetail pad 207 has a bottom surface 301 and a back surface 303. In the preferred embodiment, surfaces 301, 303, 309, and 311 are configured to have a profile and/or surface finish designed to accept and mate with corresponding surfaces in adjustable vise member 201 and working material. It is recognized that one ordinarily skilled in the art may use a variety of profiles and/or surface finishes. Bottom surface 301 is configured to permit sliding contact along raised locating surface 222. Although described as having bottom surface 301 and raised locating surface 222 in sliding contact with each other, it is understood that some embodiments may avoid contact.

Dovetail pad 207 is typically coupled to moveable assembly 225 along back surface 303 via a pad fastener 313. Pad fastener 313 is threadedly inserted into moveable assembly 225 thereby permitting pad 207 to be interchangeable or removable. Pad fastener 313 may be any type of fastener, such as a bolt clips, pins or screw, for example. Dovetail pad 207 has a counterbore 305 to accept pad fastener 313. As pad fastener 313 is tightened, pad fastener 313 presses against a bore surface 307, thereby securing dovetail pad 207.

Although shown using one pad fastener 313, it should be understood that two or more pad fasteners 313 may be used. For example, width W may be sufficiently large to permit two pad fasteners 313 to be used. In this case, moveable assembly 225 is typically increased in size such that all pad fasteners 313 are affixed to the same moveable assembly 225. This prevents shear stresses from developing and potentially warping surface 311 of dovetail pad 207 when moveable assemblies 225 are not protruding from body 203 at the same distance. Warping may decrease the surface area of dovetail pad 207 in contact with dovetail material 103 in groove 105 thereby creating more localized, rather than uniform, pressure on dovetail material 103 and dovetail pad 207. Despite potential warping of surface 311, it is understood that multiple moveable assemblies 225 may be used for a single dovetail pad 207 in other embodiments.

System 101 is configured to permit the removal and interchangeability of grippers, such as pads 207, 257. Grippers are configured to be serviced, maintained, and/or replaced. The versatility of system 101 permits a user the ability to replace grippers, thereby increasing the lifespan and applications of system 101. A single gripper may be replaced rather than the entire vise member. Inventory size and costs are reduced in the case when a gripper becomes too worn or is broken by allowing for the storage of extra grippers rather than extra adjustable vise members 201.

Figure 4:
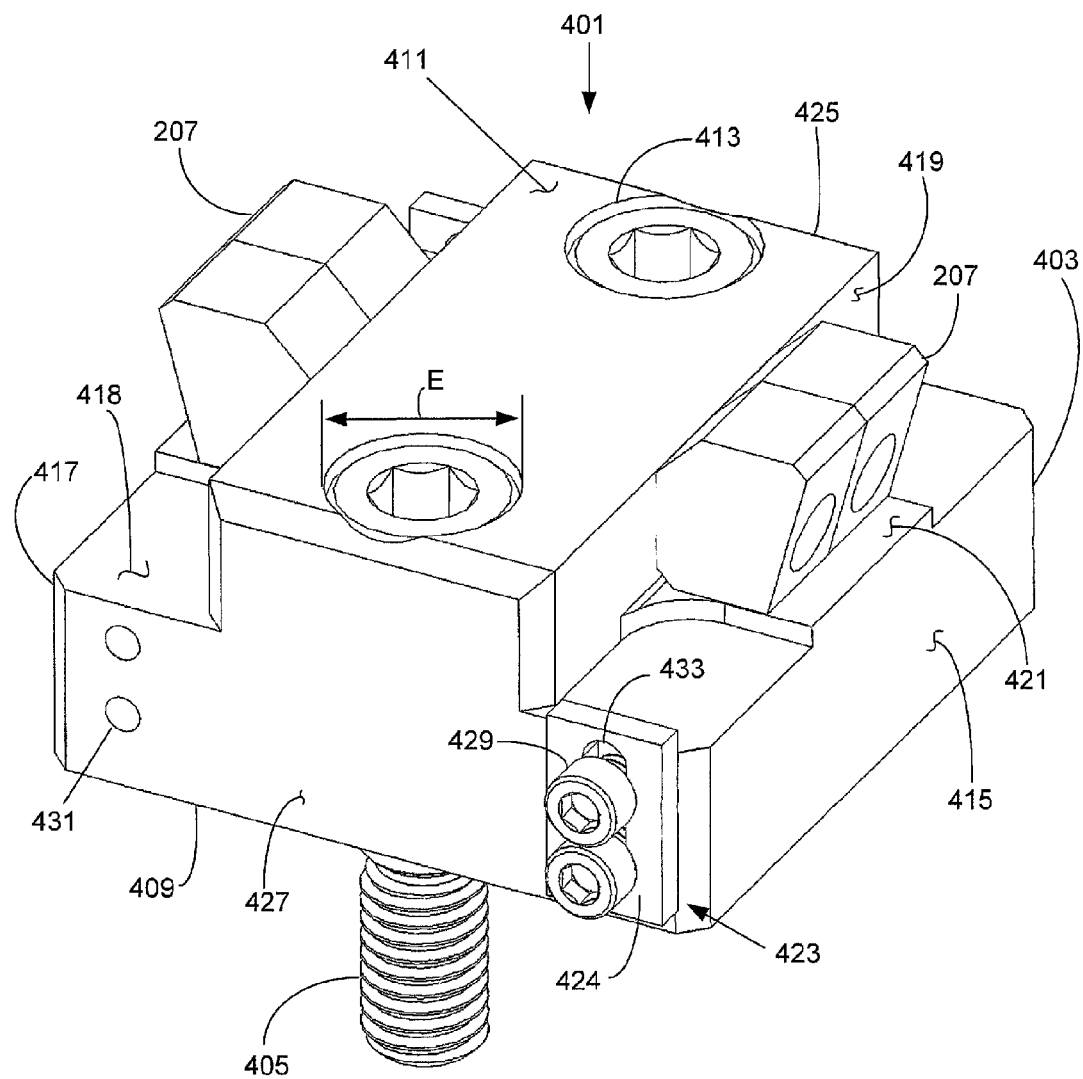
FIG. 4 is an oblique view of a fixed vise member in the system of FIG. 1.

Furthermore, although dovetail material 103 has been described, it is understood that any working object may be used with and secured by system 101. Working material may take any form or shape requiring a different type of pad. In such instances, dovetail pads 207 may be interchanged with other pads of various shape, texture, and design, such as serrated pads 257 seen in FIG. 16. Serrated pad 257 push against working objects and secure working objects by interference fit. In such instances where serrated pad 257 is used, the working object is located and supported in a variety of ways. For example, the working object may be precisely located on raised locating surface 222 or raised locating surface 421 as seen in FIG. 4. In doing so, a bottom surface 109 of the working object, such as material 103, is suspended above top surface 211. This configuration permits through-drilling in the working material without the need of sacrifice plates. In another example, the working object may be precisely located on top surface 211.

Serrated pad 257 is configured to be selected or tailored to various geometric profiles. For example, serrated pad 257 may be radiused on any surface and in any direction, thereby allowing for gripping of circular or spherical surfaces.

Although the method of coupling dovetail pad 207 to moveable assembly 225 has been described with dovetail pads 207 exclusively, it is understood that the method of coupling dovetail pads 207 is equally applicable to serrated pads 257 or any other pads that may be used. It is understood that adjustable vise member 201 may use any type of gripper to secure and/or locate a working object. Discussion above concerning dovetail pad 207 is understood to be equally applicable to other types of grippers the may be used with adjustable vise member 201. Grippers can accept pad fastener 313 from any surface.

Figure 18:
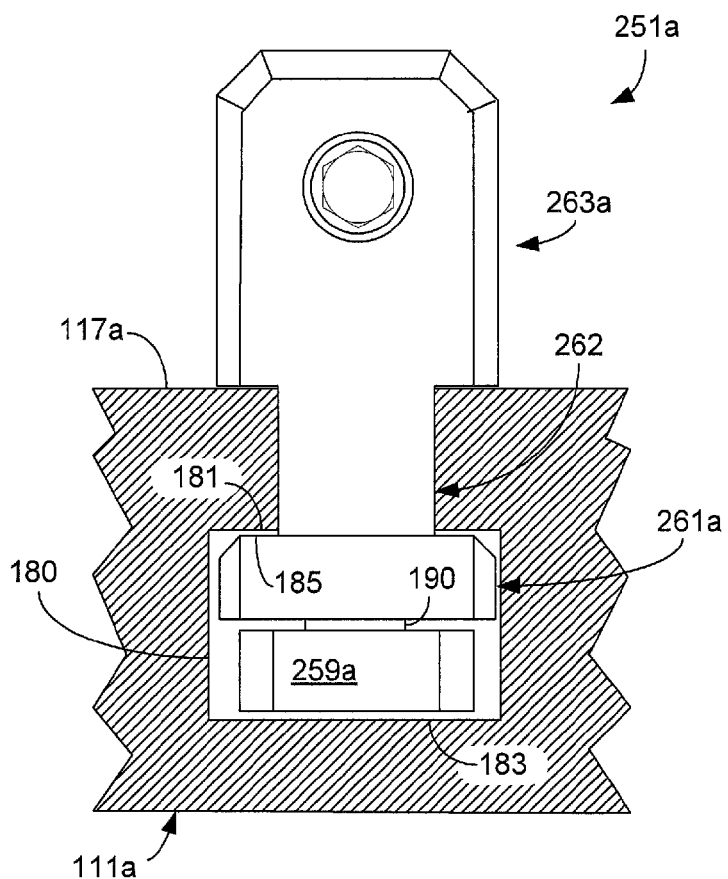
FIG. 18 is a rear view of another embodiment of FIG. 16.

Referring now also to FIGS. 16, 17A, 17B, and 18 in the drawings, embodiments of adjustable vise member 201 being adapted to fasten to a T-slot 113 is illustrated. It is understood that other methods may be used to allow adjustable vise members 201 to move relative to fixture plate 213. For example, adjustable vise member 201 may be adapted to operate within a typical T-slot in a manner understood by one of ordinary skill in the art as seen in FIG. 18. Adjustable vise member 251a has an upper portion 263a, a neck portion 262, and a lower portion 261a. Lower portion 261a is operably coupled to a bottom plate 259a by the use of one or more fasteners 190. Fasteners 190 increase or decrease the distance between lower portion 261a and bottom plate 259a when rotated. Both lower portion 261a and bottom plate 259a are located in a grooved channel 180 in a fixture plate 111a. Grooved channel 180 has an upper surface 181. Fixture plate 111a has a top surface 117a.

By rotating fastener 190, the distance between bottom plate 259a and lower portion 261a increases. Bottom plate 259a and lower portion 261a push against upper surface 181 and a lower surface 183 of grooved channel 180. In this embodiment, the force applied to fixture plate 111a is applied as the distance between lower portion 261a and bottom plate 259a increase. A surface 185 of lower portion 261a mates with upper surface 181. Surfaces 181 and 185 are precision toleranced, such that the raised locating surface adjacent to the grippers is precisely located from surface 185. Although described as using bottom plate 259a, it is understood that other embodiments of adjustable vise member 251a may remove bottom plate 259a and use fasteners 190 to press against lower surface 183. Such an embodiment is described in further detail with FIG. 20 below.

Referring to FIGS. 16, 17A, and 17B in particular. Adjustable vise member 251b is configured to couple to a fixture plate 111b wherein fixture plate 111b has a T-slot 113 as seen in FIG. 17B. Adjustable vise member 251b contains all the same functions, characteristics, and limitations as adjustable vise member 201 except with regard to how adjustable vise member 251b attaches to fixture plate 213.

Adjustable vise member 251b has a body 253, a fastener 255, a serrated pad 257, and a bottom plate 259b. Body 253 is rectangular in shape having an upper portion 263b and a lower portion 261b. Upper portion 263b and lower portion 261b form a continuous body 253. Bottom plate 259b is also rectangular in shape but narrower than lower portion 261b as seen in FIG. 17B. Lower portion 261b and bottom plate 259b are attached by fasteners 255 that protrude through an aperture 265 in lower portion 261b. Fasteners 255 are located on opposite ends of adjustable body 251. Fasteners 255 operate to retain a distance T between lower portion 261b and bottom plate 259b. A keeper or retaining ring (not shown) is used with fastener 255 to prevent bottom plate 259b from separating from fasteners 255. As fastener 255 is rotated, bottom plate 259b raises or lowers with respect to lower portion 261b thereby increasing or decreasing distance T. Each fastener 255 may be rotated individually.

T-slot 113 is an elongated passage formed in fixture plate 111b or added to fixture plate 213. T-slot 113 incorporates two raised sides 115 that extend vertically along sides 267 of bottom plate 259b, and a top plate 117b located on raised sides 115 being configured to extend between lower portion 261b and bottom plate 259b. As fasteners 255 are rotated and distance T is decreased, bottom plate 259b and lower portion 261b clamp around top plate 117b, thereby securing adjustable vise member 251 to fixture plate 111b. As fasteners 255 are loosened and distance T increases, adjustable vise member 251 may slide along the entire length of T-slot 113. This sliding feature allows adjustable vise member 251 to adjust to various sized dovetail working materials without the need to remove fasteners 255 from fixture plate 111b. Since fasteners 255 need only be loosened to permit body 253 to slide, user efficiency is increased as with adjustable vise member 201. The sliding feature grants the user flexibility by allowing one tool fixture to operate with a larger range of working objects thereby reducing the need of additional tool design when using dedicated fixtures. Although, serrated pads 257 and dovetail pads 207 have been described with different embodiments, it is understood that serrated pads 257 and dovetail pads 207 may be used in any embodiment described above. Furthermore, the shape of adjustable vise member 251b and 251a is not limited to that depicted or described. Other shapes are possible.

Figure 19:
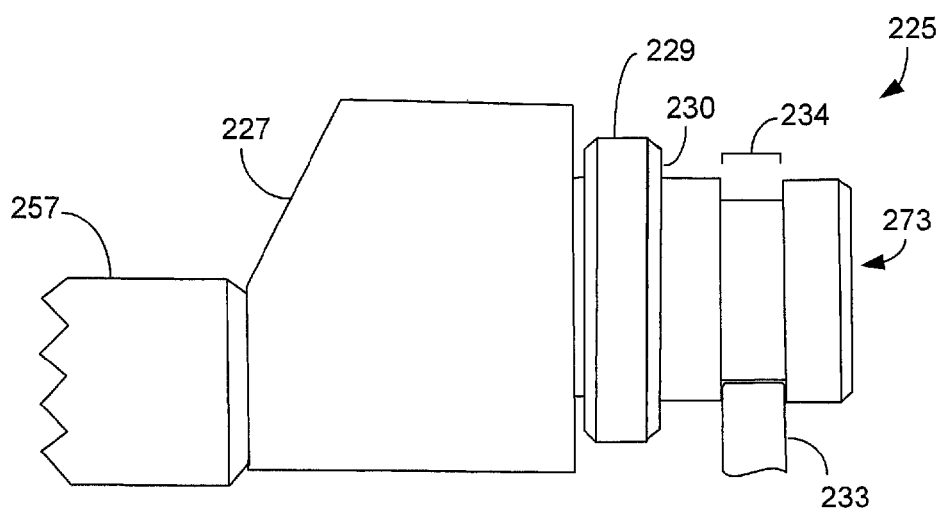
FIG. 19 is a side view of the moveable assembly of FIG. 17A.

Referring now also to FIG. 19 in the drawings, movable assembly 225 is illustrated. Adjustable vise member 201, in FIG. 2, uses moveable assembly 225 to adjust the location of dovetail pads 207. This same assembly is located in adjustable vise member 251a, 251b. Although shown in FIGS. 17A and 19, it should be understood that the description of moveable assembly 225 is equally applicable in any embodiment. For purposes here, discussion regarding movable assembly 225 will be made in reference to adjustable vise member 251b.

As seen in FIGS. 17A and 19, moveable assembly 225 includes an adjusting body 227, an adjusting screw 229, and a set pin 233. Body 253 forms a cavity to house moveable assembly 225. Moveable assembly 225 is located within the cavity and is surrounded by adjusting body 227 except where dovetail pad 207 couples to adjusting body 227. Adjusting body 227 is configured to be in sliding contact with body 253 so as to allow adjusting body 227 to protrude from or retract into body 253 as adjusting screw 229 is rotated. Adjusting body 227 protrudes from body 253 sufficiently to extend a portion of grippers beyond raised locating surface 222.

Individualized movement of grippers allows for precision tightening of working objects. Use of moveable assembly 225 to move grippers into and out of contact with working objects permits fasteners 255 to remain tightened thereby avoiding the need to readjust or reset the position of adjustable vise member 251b in order to locate, secure, or loosen working objects. In the preferred embodiment, the direction of translation for adjusting body 227 is aligned with the direction of translation for adjustable vise member 251*b*. However, other embodiments may vary the direction of translations so that they are not aligned. Moveable assembly 225, and in particular, adjusting body 227 is cylindrical in shape, however, other shapes are possible, such as square or oval, for example.

Adjusting screw 229 is in threaded contact with adjusting body 227 such that as adjusting screw 229 is rotated, adjusting body 227 translates. In the preferred embodiment, adjusting screw 229 uses left hand threads. It is understood that other embodiments may use right hand threads. Adjusting screw 229 includes a surface 230 configured to contact a surface 231 of body 253. As adjusting body 227 presses a gripper against a working object, a reactionary force is generated on moveable assembly 225. The reactionary force is transferred from moveable assembly 225 to adjustable vise member 251*b* where surface 230 and surface 231 contact. It is understood that other parts of moveable assembly 225 and/or adjustable vise member 251*b* may experience varied amounts of reactionary forces. In doing so, other locations of contact between moveable assembly 225 and adjustable vise member 251*b* may operate to transfer the reactionary force.

Moveable assembly 225 extends through body 253 toward a rear side 271, opposite dovetail pads 207. An adjusting screw aperture 273 is operably coupled to adjusting screw 229. Adjusting screw aperture 273 is accessible from rear side 271 and is configured to permit a rotating tool (not shown) to rotate adjusting screw 229. Adjusting screw aperture 273 is adapted to accept a hex-head tool. However, the scope of moveable assembly 225 is not so limited, and, as such, adjusting screw aperture 273 may be adapted to accept any other shaped tool, such as a Torx™.

Set pin 233 is configured to prevent removal of moveable assembly 225. Set pin 233 threadedly coupled to adjustable vise member 251*b* through an aperture (not shown). The aperture extends from, and parallel to, bottom surface 209. Set pin 233 extends within the cavity of body 253 sufficiently so as to engage a track 234 within moveable assembly 225. It is understood that set pin 233 is not limited to engaging track 234 from the direction depicted. Set pin 234 may engage track 234 from any direction, such as from the top or side of body 253.

Referring now also to FIG. 4 in the drawings, fixed vise member 401 of the present application is illustrated. Fixed vise member 401 contains a body 403, fasteners 405, and dovetail pad 207. Body 403 has a bottom surface 409 that is located adjacent to, and in contact with, top surface 211 of fixture plate 213. Typically bottom surface 409 and top surface 211 are in contact, but it should be appreciated that in another embodiment, a distance may exist between bottom surface 409 and top surface 211 from the use of items such as spacers or washers.

Body 403 is designed to maintain a relatively compact shape and relatively small footprint. This permits the use of the precise number of fixed vise members 401 to be used to secure dovetail material 103 according to the size of dovetail material 103. Fixed vise member 401 may be tightly positioned adjacent to each other or spread apart. This allows a minimal number of fixed vise members 401 to be tightly positioned on fixture plate 213. This design yields a higher fixture plate efficiency, wherein more dovetail materials 103 may be secured to fixture plate 213 at the same time. Members 201, 401 may be separated by any distance.

Fasteners 405 are used to secure fixed vise member 401 to fixture plate 213. In the preferred embodiment, two fasteners are used to secure fixed vise member 401 to fixture plate 213 but it is understood that one or more fasteners 405 may be used in other embodiments. Fasteners 405 prevent body 403 from sliding, rotating, or pivoting on fixture plate 213. Body 403 has one or more fastener holes 413 that extend from a top surface 411 through bottom surface 409. Fastener hole 413 has a diameter E, such that diameter E is designed to accept fastener 405 thereby aligning body 403 with fixture plate 213. Fastener 405 is inserted through fastener hole 413 from a top surface 411 and extends beyond bottom surface 409 into fixture plate 213 wherein body 403 is secured as fastener 405 is rotated. Fastener 405 is designed to precisely locate body 403 on fixture plate 213. Fastener 405 may be located from a shoulder on the shaft of fastener 405 or on any other portion of fastener 405, such as the head, for example. Fasteners 405 are typically precision dowel pins used in association with a bushing but may be any other type fastener that permits fixed vise member 401 to operate as described.

Fixed vise member 401 uses dovetail pads 207 to locate and secure dovetail material 103 as shown in FIG. 1. It is understood that dovetail pads 207 with fixed vise member 401 have the same functions, features, and limitations as that of pads 207 with adjustable vise member 201. In the preferred embodiment, dovetail pads 207 are located adjacent to a raised locating surface 421, much like adjustable vise member 201. Dovetail pads 207 are preferably located along a front side 415 or rear side 417 of body 403 so as to permit grooves 105 and dovetail pad 207 to come in contact without interference with body 403. In the preferred embodiment, two dovetail pads 207 are used on each side 415, 417, however, one or more dovetail pads 207 may be used.

Dovetail pads 207 are attached as described in FIGS. 3A-3C except that pad fastener 313 removably attaches dovetail pad 207 to body 403 along a vertical face 419. In other embodiments, pad fastener 313 may be oriented in different directions. For example, pad fastener 313 may be oriented in a vertical direction, such that counterbore 305 extends from top surface 309 and fastens dovetail pad 207 to raised locating surface 421. This configuration can allow for increased surface area contact against the working object. Fixed vise member 401 is configured to operate with any type of gripper, such as serrated pad 257.

Although depicted in FIG. 4 with fixed vise member 401 having dovetail pads 207 located on opposite sides of body 403, it should be understood that fixed vise member 401 may have one or more sides with dovetail pads 207. For example, body 403 may have dovetail pads 207 on side 415 only. In another embodiment, body 403 may accommodate dovetail pads 207 on all four sides. This would permit fixed vise member 401 to be used with four different working materials at the same time thereby further increasing fixture plate efficiency. Although described using dovetail pad 207, any gripper, such as serrated pad 257 may be used with fixed vise member 401. Likewise, fixed vise member 401 is configured to permit the removal and interchangeability of grippers as discussed above regarding adjustable vise members 201, 251*a*, 251*b*. Furthermore, grippers used with fixed vise member 401 may be oriented in a multitude of directions so as to accept different facets of working material, such as corners or multi-directional sides, to name a few. Additionally, fixed vise member may 401 is configured to use grippers that extend beyond raised locating surface 421 so as to allow working objects to be located on top surface 211.

Fixed vise member 401 incorporates the use of an adjustable stop 423 extending above a plane created by raised locating surface 421. Adjustable stop 423 is configured to contact a portion of material 103 when material 103 is secured in system 101. Adjustable stop 423 provides a fixed reference location relative to fixed vise member 401 in which material 103 may be located. It is understood that adjustable stop 423 is configured to operate with any working object. Although adjustable stop 423 is depicted in FIG. 4 as extending above a plane created by raised locating surface 421, it is understood that adjustable stop 423 may be sized and shaped as needed in order to contact the working object when the working object is engaged with the grippers. As such, adjustable stop 423 may also extend beyond a plane created by side 415, 417.

In the preferred embodiment, adjustable stop 423 includes a stop plate 424 and stop fasteners 429. Adjustable stop 423 is located on a left side 425 or a right side 427 of body 403 as seen in FIG. 4. Stop plate 424 is attached to body 403 by the use of one or more stop fasteners 429. Stop plate 424 has a slide aperture 433 that surrounds stop fasteners 429 and permits stop plate 424 to slide when loosened. Stop fasteners 429 are threadedly inserted into stop apertures 431 located in body 403. Stop plate 424 is secured in place by tightening stop fasteners 429 against stop plate 424. Stop plate 424 is kept in relatively flush contact with right side 427 or left side 425.

It is understood that other embodiments of adjustable stop 423 are possible. For example, adjustable stop 423 may be integrally formed to body 403. Furthermore, adjustable stop 423 may be removable or adjustable. In another embodiment, apertures (not shown) may be located on a surface 418. The apertures are configured to accept a pin, such as a dowel pin. The pin may be precisely located and configured to be removable and/or retractable within surface 418.

System 101 incorporates the use of one or more modular members 201, 401 to secure working objects. The compact design of system 101 offers great advantages. System 101 is designed and configured to adapt to any irregular shape or size of working object such as rectangles, triangles, or U-shape materials. System 101 can interchange grippers and may incorporate any number of members 201, 401. Multiple grippers may be moved and pressed against the object from different directions limiting degrees of freedom. Working objects may be located on top surface 211, surface 309, or raised locating surface 222, 421 depending on the type of gripper used. Due to the versatility and configuration of system 101, members 201, 401 may be set at any distance apart. This large distance may cause the flexing of working object during tooling. In order to prevent unwanted motion, system 101 may also incorporate the use of supports and bumpers.

Figure 5:
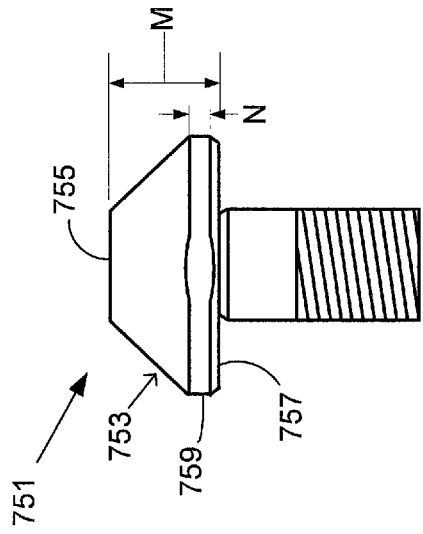
FIG. 5 is a side view of a radial locator according to the preferred embodiment of the present application.
Figure 6:
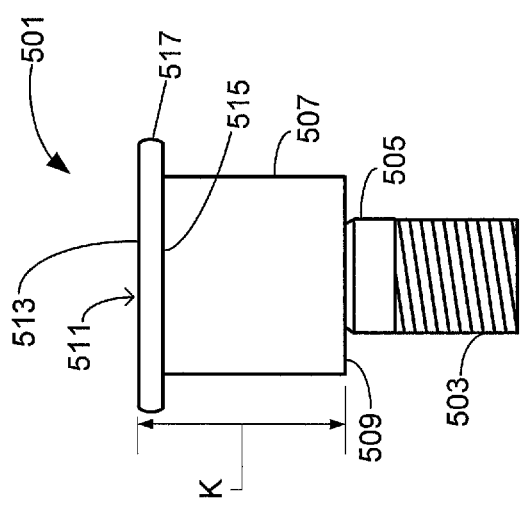
FIG. 6 is a top view of the radial locator of FIG. 5 having a bore and a fastening aperture adapted for use with a fastening tool.

Referring now also to FIGS. 5 and 6 in the drawings, a radial locator 501 used in system 101 of the present application is illustrated. Radial locator 501 is a type of bumper. Radial locator 501 is configured for precision locating of dovetail material 103. Radial locator 501 restricts the motion of dovetail material 103 so as to limit degrees of freedom during working. Radial locator 501 has a threaded portion 503, a first shaft 505, a second shaft 507, and a top plate 511. Threaded portion 503, first shaft 505 and second shaft 507 are elongated cylindrical bodies concentrically aligned having constant diameters along the length of the body. Threaded portion 503 has threads on its exterior used to couple radial locator 501 to fixture plate 213. Threaded portion 503 of radial locator 501 is threadedly inserted into fixture plate 213. First shaft 505 is inserted into fixture plate 213 as well, precisely aligning radial locator 501 in fixture plate 213. First shaft 505 is configured to align with a bushing in fixture plate 213. This permits radial locator 501 to achieve precise location and orientation with respect to top surface 211 of fixture plate 213. Radial locator 501 is therein secured by interference fit with fixture plate 213. Second shaft 507 has a bottom surface 509 that contacts top surface 211 when radial locator 501 is tightened.

A top plate 511 is integrally formed with second shaft 507 on a side opposite bottom surface 509. Top plate 511 may take different forms. In the preferred embodiment, top plate 511 is a relatively flat disk concentrically aligned with second shaft 507 as seen in FIG. 6. The diameter of top plate 511 is greater than that of second shaft 507. Second shaft extends a distance K above top surface 211 wherein distance K is of sufficient height to position top plate 511 in contact with a side of working object. Distance K may be any value. Top plate 511 has a top surface 513 and bottom surface 515. Both surfaces 513 and 515 are parallel having a full radius edge 517. Edge 517 is used to contact and limit the range of motion of working material when secured by system 101.

Although described in the preferred embodiment above, it is understood that other embodiments of bumpers may be used. For example, radial locator 501 may be configured where edge 517 is a flat vertical edge being rounded over where edge 517 meets with top surface 513 and bottom surface 515. Furthermore, in another embodiment, top surface 513 may have a curved shape so as to locate the working object at a single point rather than along a flat surface such as top surface 513. Additionally, top plate 511 may be configured to be coupled to second shaft 507 to permit dissimilar materials to be used as used in other portions of radial locator 501.

Figure 7:
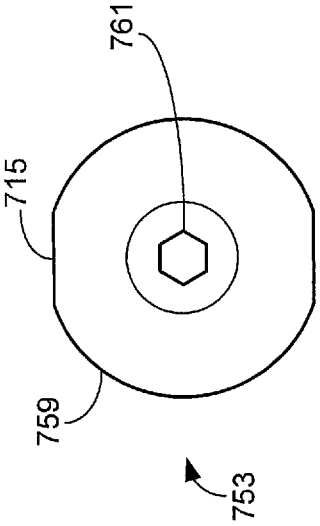
FIG. 7 is a side view of a flat support according to the preferred embodiment of the present application.
Figure 8:
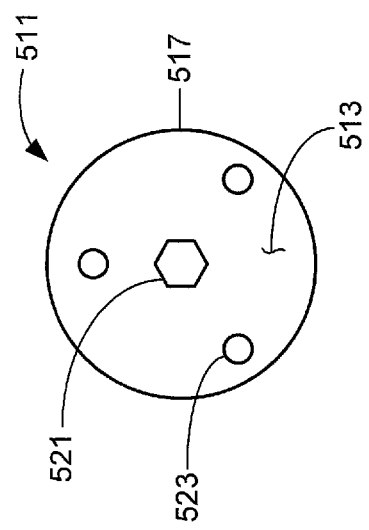
FIG. 8 is a top view of the flat support of FIG. 7.
Figure 11:
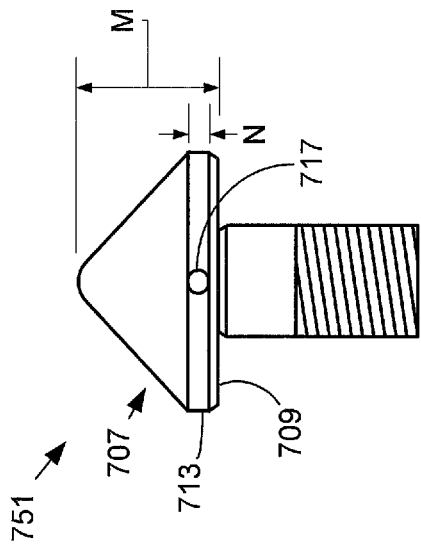
FIG. 11 is side view of the rounded support of FIG. 9 having a rotation aperture for use with a fastening tool.

Radial locator 501 may be adapted to accept a tool for rotating radial locator 501 so that radial locator 501 may be secured into fixture plate 213, such as in a threaded relationship. Radial locator 501 is shown having a bore 521. FIG. 6 illustrates bore 521 as being adapted to accept a hex-head tool. However, the scope of radial locator 501 is not so limited, and, as such, bore 521 may be adapted to accept any other shaped tool, such as a Torx™. Radial locator 501 is also shown having a set of fastening apertures 523. FIG. 6 illustrates holes 523 being adapted to accept a tri-hole insertion tool. Though illustrated with three fastening apertures 523, it is understood that one or more fastening apertures 523 may be used or located on top plate 511. Furthermore, it is understood that radial locator 501 may incorporate either bore 521 and/or hole 523 on top plate 511. Furthermore, another embodiment may use flats, as seen in FIGS. 7 and 8, on second shaft 507 to accept a tool for rotating.

Referring now also to FIGS. 7-11 in the drawings, a rounded support 701 and a flat support 751 used in system 101 of the present application is illustrated. Rounded support 701 and flat support 751 are types of supports configured for system 101. Rounded support 701 has a threaded portion 703, a shaft 705 and a head 707. Threaded portion 703 and shaft 705 are elongated cylindrical bodies concentrically aligned, each having a relatively constant diameter. Threaded portion 703 has threads on its exterior used to attach rounded support 701 to fixture plate 213. Threaded portion 703 of rounded support 701 is threadedly inserted into fixture plate 213. Shaft 705 is inserted into fixture plate 213 as well, precisely aligning rounded support 701 in fixture plate 213. This permits rounded support 701 to achieve precise location and orientation with respect to top surface 211 of fixture plate 213. Rounded support 701 is therein secured by interference fit with fixture plate 213.

Figure 9:
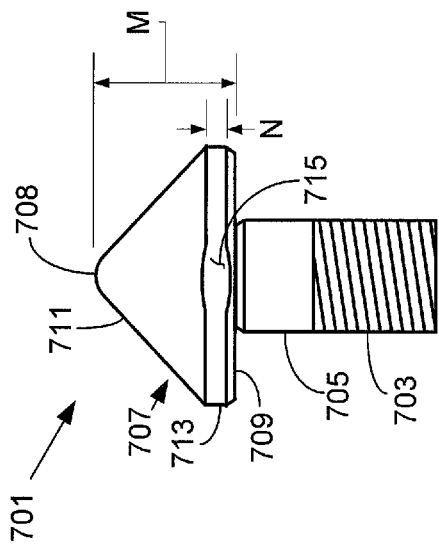
FIG. 9 is a side view of a rounded support according to the preferred embodiment of the present application.
Figure 10:
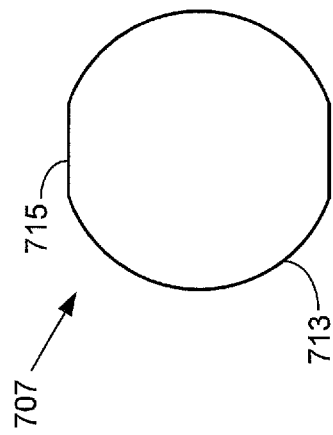
FIG. 10 is a top view of the rounded support of FIG. 9.

Head 707, as seen in FIG. 9, is designed in the shape of an inverted cone wherein a tip 708 of the cone is rounded over. Head 707 has a vertical edge 713, a top surface 711 and a bottom surface 709. Bottom surface 709 is rigidly attached to shaft 705. Bottom surface 709 has a relatively flat contour, designed such that when rounded support 701 is fastened to fixture plate 213, bottom surface 709 makes a flush contact with top surface 211 of fixture plate 213. Head 707 is sized having a distance M such that the bottom surface of working material, when secured in system 101, rests on tip 708. Distance M may vary depending on the contour of the working object. Vertical edge 713 has a height N. Height N may be any distance.

Head 707 is typically adapted to accept a fastening tool by the incorporation of at least two flats 715 on opposite sides of head 707 located on edge 713. A fastening tool grips head 707 at flats 715 thereby allowing rounded support 701 to threadedly fasten and attach to fixture plate 213. Furthermore, rounded support 701 may also contain a side fastening aperture 717 located on opposite sides of head 707 being rotated 90 degrees from flats 715 around vertical edge 713. A fastening tool would be inserted into side fastening apertures 717 thereby allowing a torque to be applied causing rounded support 701 to rotate.

Flat support 751, as seen in FIGS. 7 and 8, is very similar to that of rounded support 701 having all the same functions, limitations, and characteristics, except as to the manner of applying a fastening tool and the contour of head 707. In this embodiment, flat support 751 has a head 753 the same as described with head 707 except that head 753 is not rounded over, but is a relatively flat upper surface 755 generally parallel to that of a bottom surface 757. Flat support 751 also has a distance M from bottom surface 757 to a top surface 755, wherein bottom surface 757 rests adjacent to top surface 211 of fixture plate 213. Working material rests on top surface 755. Head 753 has an edge 759 of height N. Distances M and N may vary depending on the contour of working material.

Flat support 751 has flats 715 and may also have side fastening apertures (not shown) adapted to receive a fastening tool as well. However, because upper surface 755 is relatively flat, head 753 may also receive a bore 761 thereby allowing it to support a fastening tool such as a hex-tool or Torx™ for example. It should be understood that bore 761 may be shaped so as to receive multiple other types of fastening tools other than that specifically mentioned. Furthermore, like radial locator 501, flat support 751 and rounded support 701 are made from a unitary piece of material, although other embodiments may use dissimilar materials.

Referring now also to FIGS. 12-15 in the drawings, a tapered pin 601 and a round pin 651 is illustrated. System 101 may also use pins to locate working objects or various members of system 101, such as: adjustable vise member 201, or fixed vise member 401, to name a few. Tapered pin 601 and round pin 651 are a type of pin used in system 101. Tapered pin 601 has a threaded portion 603 and a head 605. Tapered pin is designed to be threadedly inserted into a fixture plate 213, wherein head 605 extends above top surface 211 of fixture plate 213.

Threaded portion 603 is an elongated cylindrical body having a relatively constant diameter concentrically aligned with head 605. Threaded portion 603 has threads on the exterior used to affix tapered pin 601 to fixture plate 213. Threaded portion 603 also includes a groove 604 for acceptance of a sealing member, such as an o-ring, to prevent debris from entering the threads as head 605 is raised and lowered. Head 605 has two portions: a shaft 607 and an upper portion 609. Shaft 607 is also inserted into fixture plate 213 along with threaded portion 603 to precisely locate tapered pin 601 with respect to fixture plate 213. The other portion of head 605, upper portion 609, remains above top surface 211 (not shown). Upper portion 609 generally decreases in diameter along the axis (not shown) from shaft 607 to a top surface 611.

Round pin 651 is similar to that of tapered pin 601 and has all the same functions, limitations, and characteristics as that described with tapered pin 601; except that round pin 651 does not have a tapered upper portion. Round pin 651 has a threaded portion 653 with a groove 654, and a head 655 with two portions: a shaft 657 and an upper portion 659. Shaft 657, groove 654, and threaded portion 653 operate as described in tapered pin 601. Upper portion 659, however, is not tapered along the axis from shaft 657 to a top surface 661. Upper portion 659 retains a relatively constant diameter equal to that of shaft 657 thereby creating one continuous cylindrical head 655.

Figure 14:
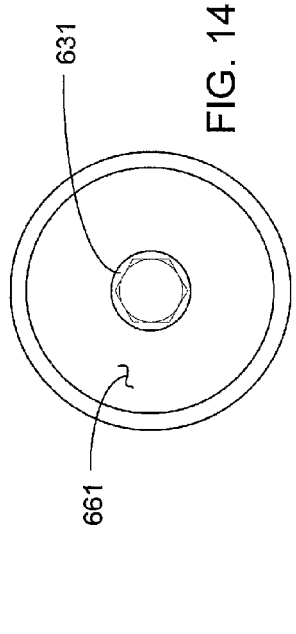
FIG. 14 is a top view of a round pin according to the preferred embodiment of the present application.
Figure 15:
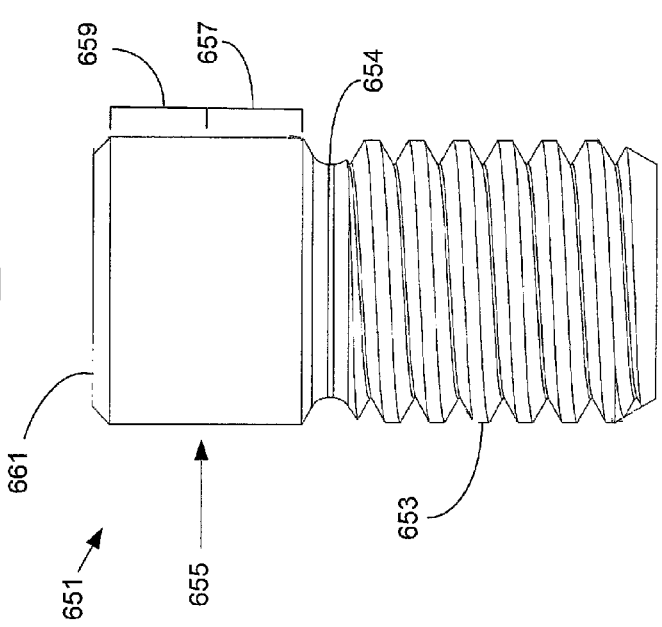
FIG. 15 is a side view of the round pin of FIG. 14.
Figure 12:
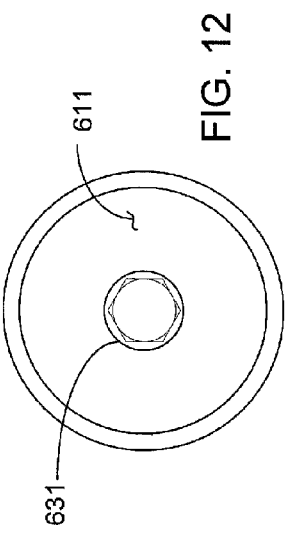
FIG. 12 is a top view of a tapered pin according to the preferred embodiment of the present application.
Figure 13:
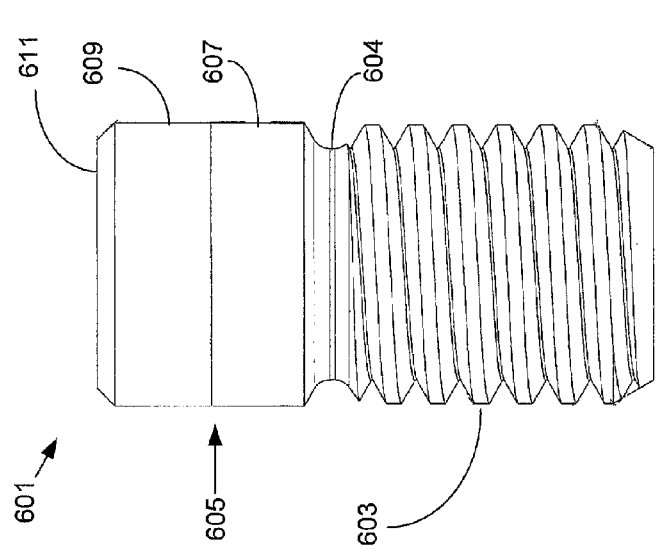
FIG. 13 is a side view of the tapered pin of FIG. 12.

Both pins 601, 651 may be adapted to accept a fastening tool for rotating pins 601, 651 into fixture plate 213, such as in a threaded relationship. Pins 601, 651 are shown having a bore 631. FIGS. 12 and 14 illustrate bore 631 as being adapted to accept a hex-head tool. However, the scope of pins 601, 651 is not so limited, and, as such, bores 631 may be adapted to accept any other shaped tool, such as a Torx™.

In the preferred embodiment, typically at least one rounded pin 651 and one tapered pin 601 may be used to locate the items stated above, but any number may be used. By using tapered pin 601 with round pin 651, working material is less apt to bind on pins 601, 651 allowing for working material to be removed more easily. Tapered pin 601 also allows for working material to center a receiving aperture in working material on tapered pin 601. The upper portions 609, 659 are generally designed to remain above top surface 211 and insert into apertures (not shown) in working material thereby precisely locating them relative to fixture plate 213. In some instances, it may be desired to not use pins 601, 651. In such an instance, pins 601, 651 may be retracted into fixture plate 213 such that top surface 611, 661 is flush with top surface 211. This occurs by threadedly rotating pins 601, 651 into fixture plate 213.

In operation, rounded pin 651 may be threadedly raised into contact with an item such that shaft 657 concentrically aligns with and is inserted into an aperture in working material. Thereafter, tapered pin 601 may be threadedly raised into contact with the item. Tapered portion 609 of head 605 allows the user to "fit" the aperture in working material to match tapered pin 601. By screwing tapered pin 601 up or down, the tightness of the aperture around head 605 is changed. Although described in the preferred embodiment as engaging items by being raised from a full flush location with top surface 211, it is understood that pins 601, 651 may engage with items in any number of ways. Several pins 601, 651 may be used of either type.

Furthermore, like radial locator 501, any of the embodiments described through the use of FIGS. 7-15 are made from a unitary piece of material, although other embodiments may use dissimilar materials. In addition, any of the embodiments described through the use of FIGS. 5-15 may incorporate the use of flats like may use flats 715 at any location.

System 101 has been described as being adapted to accept various tools for rotating fasteners or components of system 101. It is understood that system 101 is configured to minimize the number of tools required to operate system 101. For example, a single type and sized tool may be used to operate fasteners 205 and adjusting screw aperture 273. This configuration permits increases the speed and efficiency of system 101. Furthermore, modular vise system 101 is configured to operate with fixture plates of various thicknesses and is configured to minimize the thickness required to support the working object.

Referring now also to FIGS. 20A-20F in the drawings, a slider 270 for use in a T-slot is illustrated. Slider 270 includes a pin 275 and/or a retractable stud 279 integrally secured within an upper portion 272 and a lower portion 274. Although adjustable vise member 251a is described as using bottom plate 259a, it is understood that other embodiments may remove bottom plate 259a, such that fasteners 190 press against lower surface 183 when rotated. Slider 270 is similar in form and function to that of adjustable vise member 251a described in relation to FIG. 18. However, slider 270 is configured to function within a T-slot without the use of a bottom plate, like bottom plate 259a. It is understood that other embodiments of slider 270 may use a bottom plate in the T-slot. By not using a bottom plate, slider 270 may be used in shallower T-slots. The configuration of adjustable vise member 251b also lends itself for use in shallower T-slots.

In this embodiment, FIGS. 20A-20F illustrates slider 270 with both pin 275 and retractable stud 279. Pin 275 is configured to locate a working object and retractable stud 279 is configured to hold or fasten the working object to slider 270. Pin 275 is similar in form and function to that of pins 601 and 651 described in FIGS. 12-15. Pin 275 is threadedly engaged with upper portion 272 and precisely locates the working object. In such a threaded relationship with upper portion 272, pin 275 is configured to retract into upper portion 272 such that surface 276 of pin 275 is flush with surface 277 of upper portion 272. Likewise, the threaded relationship also permits pin 275 to be removable from upper portion 272.

This embodiment also includes retractable stud 279 integrally coupled within upper portion 272. Retractable stud 279 is similar to locator studs described in parent applications. Retractable stud 279 has a stud 281 and a bias housing 282. Bias housing 282 is coupled to lower portion 274 by press fit applications or interference fit. Stud 281 may be a generally cylindrical member having a first set of threads 284 along an exterior surface of stud 281, a first neck portion 285, a stud flange 286, a second neck portion 287, a second set of threads 288, an upper adjustment bore 289, and an optional lower adjustment bore 290.

Stud 281 is generally operable between two positions: a retracted position in which stud 281 is enclosed within a cavity 293 within slider 270 and an extended position in which stud 281 extends above a surface 277 to engage a working object. In the extended position, threads 284 of stud 281 are used to engage the working object, such that stud 281 is received into the working object. The working object is secured by threaded relationship as an upper surface of stud flanges 286 contacts surface 295 as seen in FIG. 20C. Stud 281 may be maintained in a retracted position by positive engagement between second set of threads 288 and an internal threads 294 in bias housing 282. Stud 281 extends from the retracted position by inserting a wrench tool into either the upper adjustment bore 289 or the lower adjustment bore 290 and rotating stud 281 until the second set of threads 288 disengage from the internal threads 294 of bias housing 282. Where the lower adjustment bore 290 is to be utilized, cavity 293 may provide access to lower adjustment bore 290.

A spring 291, housed in retractable stud 279, is coupled to bias housing 282 and acts against a lower surface of stud flange 286 to bias stud 281 away from bias housing 282. Spring 291 causes stud 281 and the first set of threads 284 to protrude above surface 277 when stud 281 is released from internal threads 294. Once threads 288 disengage from the threads 294, spring 291 forces stud 281 upwards. Because second set of threads 288 release from the internal threads 294 of bias housing 282 prior to engagement of the first set of threads 284, stud 281 does not undergo any unnecessary binding. As stud 281 continues to rotate, first set of threads 284 cause stud 281 to advance into the working object until stud flange 286 contacts surface 295.

As described previously, bias housing 282 may be secured to slider 270 by press-fit applications or by interference fit. When interference fit is used, bias housing 282 may include a washer-shaped cover having internal threads and external threads to permit bias housing 282 to be threadedly engaged with slider 270 and be secured by interference fit as described above. The cover would be configured to permit access to lower adjustment bore 290. The internal threads engage stud 281 to hold stud 281 in a retracted position. A retaining ring, such as a C-type retaining ring, sized, shaped, and adapted for receiving a typical retaining ring tool, may be used to prevent the cover from detaching from slider 270. It will be appreciated that in alternative embodiments the retaining ring may be of a type other than a C-type retaining ring.

Slider 270 may retract pin 275 while retractable stud 279 is used to hold the working object. Slider 270 may also retract retractable stud 279 and use pin 275 to locate the working object. Furthermore, both pin 275 and retractable stud 279 may be retracted or extended in conjunction together to hold and locate the working object.

Although slider 270 has been described as having retractable stud 279 and pin 275, it is understood that slider 270 may be configured to utilize either retractable stud 279 or pin 275. For example, other embodiments of slider 270 are configured to have only pin 275, wherein pin 275 is used to locate a working object. In another example, slider 270 may be configured to utilize only retractable stud 279, wherein retractable stud 279 is used to hold a working object.

In yet another embodiment of slider 270, retractable stud 279 may be configured to precisely locate a working object as well as securely fasten or hold the working object to slider 270. This feature of retractable stud 279 precisely locating a working object may be applied to any of the preceding embodiments disclosed with respect to slider 270. In such an embodiment, retractable stud 279 may be configured, such that first neck portion 285 may include a high accuracy smooth portion configured for precise engagement with a bushing located in area 292. First neck portion 285 and the bushing would have complementary receiving diameters. First neck portion 285 and the bushing would ensure highly accurate/close-tolerance positioning of a working object while simultaneously securing the working object.

In some instances, stud 281 may be constructed of steel. For example, stud 281 may be formed from low carbon steel, stainless steel, high strength steel, or any other desired steel. In some instances, stud 281 may be formed from 17-4PH stainless steel. In other implementations, of stud 281 may be formed from aluminum, bronze, copper, titanium, tin, or any other desired metal. Still further, stud 281 may be formed from non-metallic materials, such as polymers, ceramics, glass, or any other material.

Lower portion 274 is similar in form and function to that of lower portion 261a as described in FIG. 18. Lower portion 274 is configured to translate within a T-slot. Slider 270 illustrates an embodiment wherein a bottom plate, like bottom plate 259a, is not used to secure the member in a T-slot. In this embodiment, fasteners 271 threadedly engage with lower portion 274, so as to retract and extend in relation to surface 273, thereby extending a foot 297 beyond surface 273. Foot 297 acts to press against a surface of the T-slot, such as lower surface 183 in FIG. 18. The use of foot 297 helps to prevent marring or damage to the T-slot. Foot 297 may be made of various materials and have surface treatments to increase grip. For example, foot 297 may have a rubber coating surrounding the tip of fastener 271.

In embodiments where retractable stud 279 is used to secure the working object, fasteners 271 and foot 297 may be optionally used. For example, when a working object is secured with retractable stud 279, the threaded relationship between first set of threads 284 engaging with the working object and stud flange 286 pressing against surface 295, can operate to press surface 298 of lower portion 274 against a surface of the T-slot, such as surface 181 as seen in FIG. 18. In such a situation, it is optional for a user to engage foot 297 with the T-slot.

The configuration used with slider 270 allows the T-slot to be shallower in that the distance between upper surface 181 and lower surface 183 is smaller. A smaller distance allows T-slots to be used in thinner fixture plates. Although described for use with shallower T-slots, the thickness of lower portion 274 and the length of fasteners 271 may be extended to operate with varied height T-slots.

The features and limitations described with slider 270 may be used in conjunction with adjustable vise member 251*a* and 251*b*. Likewise the features and limitations described with respect to adjustable vise member 251*a* and 251*b* may be used in conjunction with slider 270. Furthermore, other features with respect to retractable stud 279 have been described herein. Other features are understood to exist, such as those features described in parent applications.

System 101 is a compilation of a number of members, pins, and supports that are configured to operate together to allow for precise and secure machining and tooling of working material. The current application has many advantages over the prior art including the following: (1) the ability to adjust a vise member's location relative to a fixture plate without removing the fasteners; (2) multiple smaller vise members allow for a higher fixture plate efficiency; (3) raised locating surfaces allow drill through without the use of sacrifice plates or the marring of the fixture plate or vise; (4) ability to secure working material of multiple shapes, sizes, and orientations; (5) quick and precise location and interchanging of vises or working material; (6) ability to locate working material vertically or with the vise bottom; (7) advantage of using multiple grippers; and (8) ability to push working material from multiple directions.

The particular embodiments disclosed above are illustrative only, as the disclosure may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. It is apparent that an application with significant advantages has been described and illustrated. Although the present disclosure is shown in a limited number of forms, it is not limited to just these forms, but is amenable to various changes and modifications without departing from the spirit thereof.

What is claimed is:

1. A modular vise system for holding working objects having a bottom surface, the modular vise system, comprising:
    a fixture plate having a grooved channel with an upper surface and a lower surface; and
    an adjustable vise member for coupling the working object to the fixture plate, the adjustable vise member being configured to locate and secure the working object in relation to the fixture plate, the adjustable vise member comprising:
        a body having a first fastener configured to allow the body to selectively translate relative to the fixture plate, the body forming a cavity, the body having:
            an upper portion;
            a neck portion integral with the upper portion;
            a lower portion engaged with the neck; and
            a second fastener adjustably engaged with the lower portion and having a bottom plate;
        wherein the lower portion and the second fastener are positioned within the grooved channel; and
        wherein the lower portion and the bottom plate are configured to move in a direction away from each other to engage with respective upper and lower surfaces of the grooved channel;
        a moveable assembly housed at least partially within the cavity of the body and configured to selectively translate relative to the body, thereby allowing further precision locating of the working object; and
        a gripper configured to secure the working object, the gripper coupled to the moveable assembly;
        wherein the adjustable vise member is configured to stack so as to allow a plurality of adjustable vise members to share the same first fastener, the adjustable vise member having at least one flange.

2. The modular vise system of claim 1, wherein the gripper is interchangeable.

3. The modular vise system of claim 1, wherein the gripper is a metallic material.

4. The modular vise system of claim 1, wherein the fixed vise member has an adjustable stop configured for precision locating of the working object.

5. The modular vise system of claim 4, wherein the adjustable stop is retractable so as to be flush with a surface on the body.

6. The modular vise system of claim 1, further comprising:
    a support for supporting the working object between the bottom surface and the fixture plate.

7. The modular vise system of claim 6, wherein the support is a rounded support, wherein the head has a conical shape.

8. The modular vise system of claim 6, wherein the support is a flat support, wherein the head has a top surface and a bottom surface, the bottom surface configured to contact the fixture plate, the top surface configured to contact and support the working object.

9. The modular vise system of claim 1, further comprising:
    a bumper having a top plate configured to locate the working object, the top plate elevated from the top surface of the fixture plate so as to contact the working object.

10. The modular vise system of claim 1, further comprising:
    a pin for precision locating of the working object, the pin having a head protruding from the fixture plate.

11. The modular vise system of claim 10, wherein the pin is a tapered pin, the tapered pin having a tapered head shape to allow precision locating and prevent binding of the working object on the pin.

12. The modular vise system of claim 10, wherein the pin is a round pin configured to precisely locate the working object.

13. The modular vise system of claim 10, wherein the pin is retractable within the fixture plate, such that a top surface of the pin is flush with the fixture plate.

14. The modular vise system of claim 1, further comprising:
    a slider configured to translate within a T-slot, the slider having an upper portion extending above the fixture plate.

15. The modular vise system of claim 14, wherein the upper portion of the slider has at least one of a pin for locating the working object and a retractable stud configured to secure the working object.

* * * * *